United States Patent
Edlinger

(10) Patent No.: US 9,751,762 B2
(45) Date of Patent: Sep. 5, 2017

(54) METHOD FOR RECYCLING ORGANIC WASTE MATERIAL

(75) Inventor: Alfred Edlinger, Bartholomäberg (AT)

(73) Assignee: ICL Europe Cooeperatief U.A., Amsterdam (NL)

( * ) Notice: Subject to any disclaimer, the term of this patent is extended or adjusted under 35 U.S.C. 154(b) by 0 days.

(21) Appl. No.: 13/885,585

(22) PCT Filed: Oct. 18, 2011

(86) PCT No.: PCT/EP2011/068157
§ 371 (c)(1),
(2), (4) Date: Jun. 25, 2013

(87) PCT Pub. No.: WO2012/065798
PCT Pub. Date: May 24, 2012

(65) Prior Publication Data
US 2013/0272944 A1    Oct. 17, 2013

(30) Foreign Application Priority Data
Nov. 15, 2010 (AT) ................. A 1875-2010

(51) Int. Cl.
| | |
|---|---|
| *C01B 25/08* | (2006.01) |
| *C01B 25/01* | (2006.01) |
| *C02F 11/18* | (2006.01) |
| *C01B 25/02* | (2006.01) |
| *C02F 11/00* | (2006.01) |
| *C02F 11/06* | (2006.01) |

(52) U.S. Cl.
CPC .............. *C01B 25/08* (2013.01); *C01B 25/01* (2013.01); *C01B 25/02* (2013.01); *C02F 11/18* (2013.01);
(Continued)

(58) Field of Classification Search
CPC ..... C01B 25/12; C01B 25/26–25/4555; C01B 25/003; C01B 25/04; C01B 9/02;
(Continued)

(56) References Cited

U.S. PATENT DOCUMENTS

| | | | |
|---|---|---|---|
| 5,776,226 A | | 7/1998 | Edlinger |
| 6,022,514 A | * | 2/2000 | Nakahara .................. B09B 3/00 423/322 |

(Continued)

FOREIGN PATENT DOCUMENTS

| | | |
|---|---|---|
| EP | 0 707 083 A1 | 4/1996 |
| EP | 2 228 146 A1 | 9/2010 |

(Continued)

OTHER PUBLICATIONS

Beckmann et al, "Vergasung von Abfällen in Rostsystemen", Springer VDI-Verlag GmbH, Düsseldorf, Jan. 1, 1998 (Jan. 1, 1998), pp. 80-109, ISBN:3-18-990035-3, found on the Internet: URL:https://tu-dresden.de/die_tu_dresden/fakultaeten/falkutaet_machinenwesen/ifvu/evt/Veroeffentlichungen/Beckmann_90-07/Be-22.pdf—Translation of abstract section 4, p. 20.

*Primary Examiner* — Anthony J Zimmer
(74) *Attorney, Agent, or Firm* — Laurence A. Greenberg; Werner H. Stemer; Ralph E. Locher

(57) ABSTRACT

A method for recycling organic waste material containing phosphorus oxides and metal oxides is particularly suited for recycling sewage sludge. The waste materials are mixed with chlorine carriers and then heat-treated at an air ratio of $0.85 \leq \lambda \leq 1.6$ and at least partially oxidized. The metal chlorides thus formed are drawn off and recovered and the fraction remaining after the metal chlorides have been drawn off is subjected to reduction in order to obtain elemental phosphorus.

12 Claims, 3 Drawing Sheets

(52) U.S. Cl.
CPC ............ *C02F 11/004* (2013.01); *C02F 11/06* (2013.01); *Y02W 10/40* (2015.05)

(58) Field of Classification Search
CPC ..... C01B 25/02; C01B 25/023; C01B 25/027; C01B 25/08; C01D 3/04–3/08; C01D 15/04; C01F 5/30; C01F 7/56; C01F 11/24; C01F 11/28; C01F 17/0068; C01G 3/05; C01G 3/06; C01G 43/08; C01G 51/085; C01G 53/09; C02F 2101/105; C02F 1/70; C02F 1/705; C02F 1/72; C02F 1/727; C02F 1/74; C02F 1/76; C02F 1/763; C02F 3/1215
See application file for complete search history.

(56) References Cited

U.S. PATENT DOCUMENTS

| | | | |
|---|---|---|---|
| 6,241,797 B1 * | 6/2001 | Edlinger | .................. 75/10.14 |
| 2005/0138964 A1 | 6/2005 | Edlinger | |
| 2011/0179907 A1 * | 7/2011 | Edlinger | .................. 75/10.14 |

FOREIGN PATENT DOCUMENTS

| | | | |
|---|---|---|---|
| JP | 10337549 A | * | 12/1998 |
| JP | H10337549 A | | 12/1998 |
| WO | 03/070651 A1 | | 8/2003 |
| WO | WO 2010022425 A1 | * | 3/2010 |

\* cited by examiner

METHOD FOR RECYCLING ORGANIC WASTE MATERIAL

BACKGROUND OF THE INVENTION

Field of the Invention

The invention relates to a method for recycling organic waste material containing oxides of phosphorus and metal oxides, in particular for recycling sewage sludge.

Recycling organic waste material, in particular sewage sludge, dry sludge, sewage sludge ash and animal meal, is an important aspect of environmental technology; because of the complex composition of the waste material involved, recycling is particularly difficult if, in addition to largely harmless natural substances, the waste material also contains environmental toxins such as heavy metals, halogens, pesticides, herbicides, antibiotics, carcinogenic and mutagenic contaminants, chlorinated hydrocarbons, polychlorinated biphenyls, hormones and endocrines. Along with the heavy metals copper, zinc and cadmium, sewage sludge also contains various oxides of calcium, silicon and aluminium, and in particular the presence of iron oxides renders the extraction of pure phosphorus impossible since phosphorus binds with iron to form iron phosphide and thus cannot be obtained in its pure form when iron is present. The quantity of the various metals and heavy metals usually prevents sewage sludge from being used directly as a fertilizer, and so sewage sludge has to be dumped in large quantities. However, dumping sewage sludge means that the recyclable materials contained therein, in particular phosphorus, which is not just of interest to the fertilizer industry, cannot be put to use.

Thus, the aim of the present invention is to extract phosphorus or its derivatives in as pure a form as possible as a recyclable material from organic waste material and in particular from sewage sludge, and to separate out the metals it contains.

In order to accomplish this aim, the waste material of the aforementioned type is mixed with chlorine carriers and then heat treated at an air ratio of $0.85 \leq \lambda \leq 1.6$ and partially oxidized, the metal chlorides formed are drawn off and recovered and the fraction remaining after the metal chlorides have been drawn off undergoes a reduction in order to obtain elemental phosphorus.

The fact that the waste material to be processed is mixed with chloride carriers means that in the subsequent oxidation step, which is carried out at raised temperatures, the metals are transformed into metal chlorides which are volatile and thus can be drawn off with the gas phase. In accordance with the invention, the remaining fraction then undergoes a reduction, whereupon pure phosphorus is obtained from the oxides of phosphorus. Thus, using the method of the invention, the aforementioned metals and metal oxides and in particular the iron oxides are separated out as metal chlorides before the phosphorus is extracted in its elemental form by reduction.

Preferably, the heat treatment is carried out at temperatures of 1300° C.-1600° C.

In a preferred implementation, the method of the invention is further refined by the fact that in addition, lime is added to the waste material. In the method of the present invention, lime forms liquid molten slag with the inorganic combustion products; the quantity of lime to be added should be adapted to the $SiO_2$ content of the combustion products; in particular, a ratio of $0.85 \leq CaO/SiO_2 \leq 1.3$ should be established. The slag which is produced can be used to good effect in the cement industry.

In order to obtain high efficiency in the oxidation step, the waste material is advantageously introduced into the oxidation step in a finely divided state. In accordance with a preferred embodiment of the present invention, the method is advantageously further refined in that for the purposes of oxidation, the waste material mixed with the chloride carriers is forced into a combustion chamber with a carrier gas via a cyclone, whereby preferably, an oxygen-containing gas, in particular hot air, is used as the carrier gas. As an example, a method of this type can be carried out with the device of WO 03/070651 A1, which device has already been used successfully for melting dust. In that device, the cyclone is upstream of the actual combustion chamber and the material or the waste material is blown in tangentially with the carrier gas and set in a rotary motion so that the waste material is introduced into the downstream combustion chamber with a preferred spin. Upon entering the combustion chamber, rotation of the flow can be maintained for as long as possible so that a relatively long contact time with the flame is ensured over a relatively short axial length in the combustion chamber, and thus the reaction time which is available for oxidation is relatively long.

A particularly advantageous synergistic effect exists with other branches of industry and areas of the waste industry if, in a preferred embodiment of the present invention, the method is further refined such that the chloride carriers are selected from the group consisting of chloride-containing polymers, alkali chlorides, alkaline-earth chlorides, cement kiln dust and steel mill dust. Chloride-containing polymers are available, for example, in the form of PVC, and cement kiln dust and steel mill dust are considered to be problematic waste material in the respective branches of the industry, and so these materials are readily and cheaply available for carrying out the method of the invention and can be put to good use.

BRIEF SUMMARY OF THE INVENTION

In accordance with the present invention, after the oxidation step and drawing off the metal chlorides formed in the oxidation step, a step for reduction of the remaining fraction, which contains the phosphorus, is carried out; in this case, preferably, the fraction remaining after drawing off the metal oxides is reduced using an at least partially inductively heated column with lump coke and/or graphite and the elemental phosphorus which is liberated is drawn off. At the same time, the reduction gas formed (CO, $H_2$) is drawn off. Following phosphorus condensation, this gas can be used as a reduction or combustion gas, for example as an energy supply for the heat treatment of the waste material. Reduction on an at least partially inductively heated column is known, for example, from WO 2006/079132 A1; that document also discloses an appropriate device for carrying out a reduction step. Using an at least partially inductively heated coke column means that exceedingly high temperatures can be obtained, whereupon a reducing atmosphere can be set up since the carbon of the column is not in thermal equilibrium with combustion products and in particular not with $CO_2$. In contrast to the method described in WO 2006/079132 A1, when using an inductively heated column the recyclable material is not contained in the melt, but is drawn off with the reaction gas and, in a preferred embodiment of the present invention, can be obtained as white phosphorus by quenching.

In a preferred embodiment of the present invention, in the reduction step, the redox potential of the column is adjusted by blowing in gases and the temperature of the column is adjusted by adjusting the electrical power and by blowing in gases. In this manner, the redox potential and the temperature can be adjusted such that only the desired phosphorus is reduced and other oxides remain in the residual fraction.

The method of the invention is employed to separate the metals or metal oxides from phosphorus prior to the reduction step, in order to prevent the uncontrolled formation of iron phosphide. When, however, the phosphorus contained in the waste material has been produced in its pure form using the method of the invention, the production of pure iron phosphide may in fact be desired, since the oxidation of iron phosphide produces iron phosphate which is a valuable starting material for the manufacture of lithium iron phosphate. Lithium iron phosphate itself is rapidly gaining importance as a cathode in lithium ion batteries. The method of the invention is thus preferably further refined in that the residual fraction after drawing off the metal chloride is mixed with iron or iron oxide. The lithium required may be obtained from clinker kiln dust, for example.

In a further aspect of the invention, an alternative, simplified procedure is provided in which the cited waste material and lime are placed on an inductively heated coke and/or graphite bed. The resulting exhaust gas then undergoes fractionating cooling: at 400-600° C., the chloride-containing contaminants precipitate out and can be separated by means of a cyclone or hot gas separator. Further cooling, for example in a water quench, results in the condensation of phosphorus. The remaining gas can be used as a combustion and/or reaction gas after optional drying.

BRIEF DESCRIPTION OF THE SEVERAL VIEWS OF THE DRAWING

The invention will now be described in more detail with the aid of an exemplary embodiment illustrated in a diagrammatic manner in the drawings. In the drawings.

DESCRIPTION OF THE INVENTION

Figure 1:
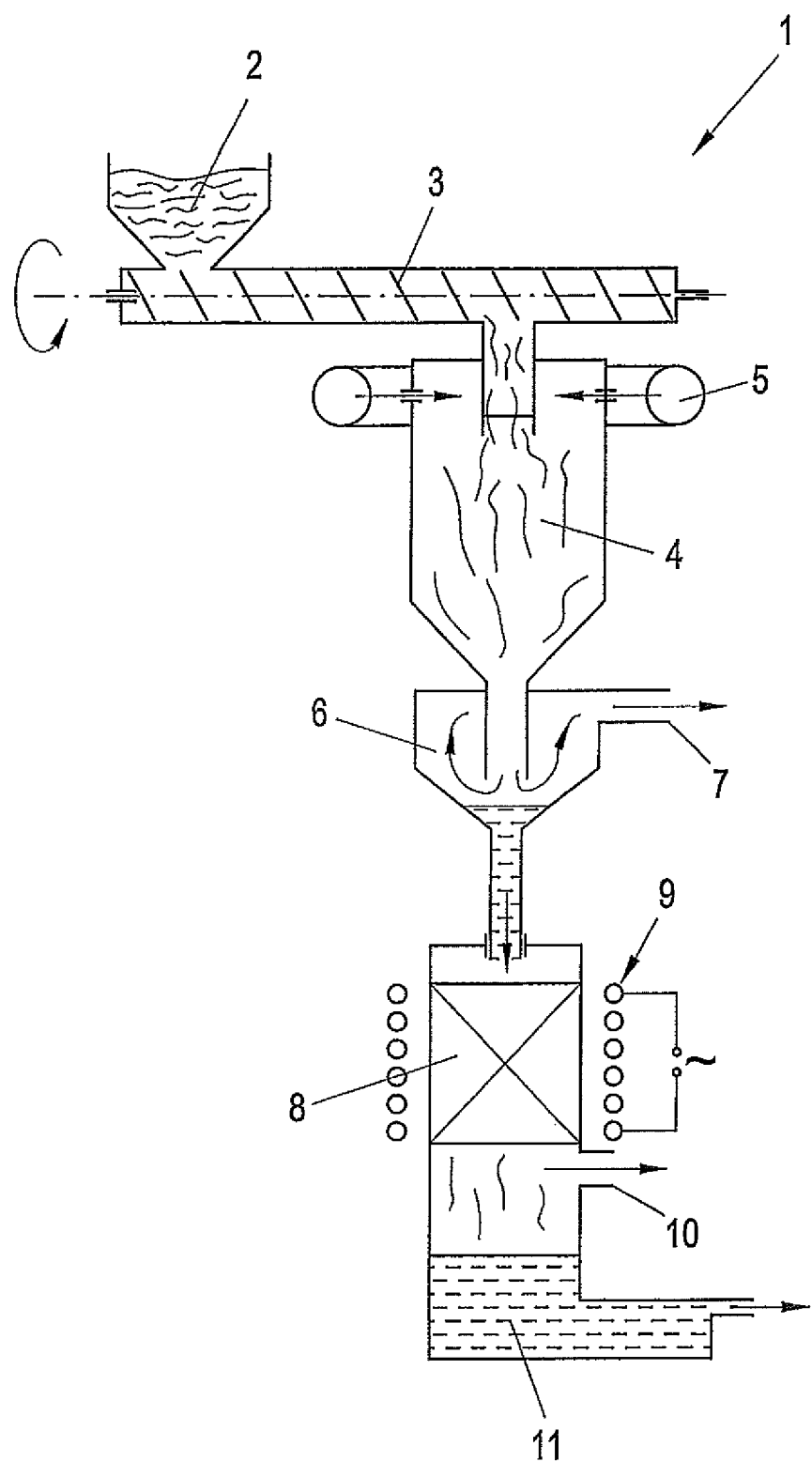
FIG. 1 shows a device for carrying out the method of the invention.

In FIG. 1, the reference numeral 1 indicates a device for carrying out the method of the invention. The waste material is supplemented with chloride carriers and/or lime and sent to the infeed station 2. The reference numeral 3 indicates a dosing device, for example in the form of a conveying screw; it is used to convey the materials into the interior of a combustion chamber 4. A ring line 5 which opens into the combustion chamber 4 at appropriate locations can be used to set an appropriate air ratio of air, $O_2$ and, if appropriate, gaseous chloride carriers. Downstream of the combustion chamber is a cyclone or droplet separator 6 in which the melt with the partially oxidized phosphorus is separated from the product gas. The product gas or reduction gas, which contains $CO_2$, CO, $H_2O$ and $H_2$ in addition to the metal chlorides, is drawn off via the discharge line 7. The melt, if appropriate supplemented with $O_2$ and carbon carriers, is sent to a coke and/or graphite bed 8. The coke and/or graphite bed 8 is inductively heated by means of the coil 9. Reduction to elemental phosphorus occurs in the bed 8; the phosphorus is drawn off via the opening 10 and can then be condensed and obtained as white phosphorus. The residual molten slag collects in a tundish 11; after tapping 12, it can, if appropriate, be further processed into iron phosphide and iron phosphate.

Figure 2:
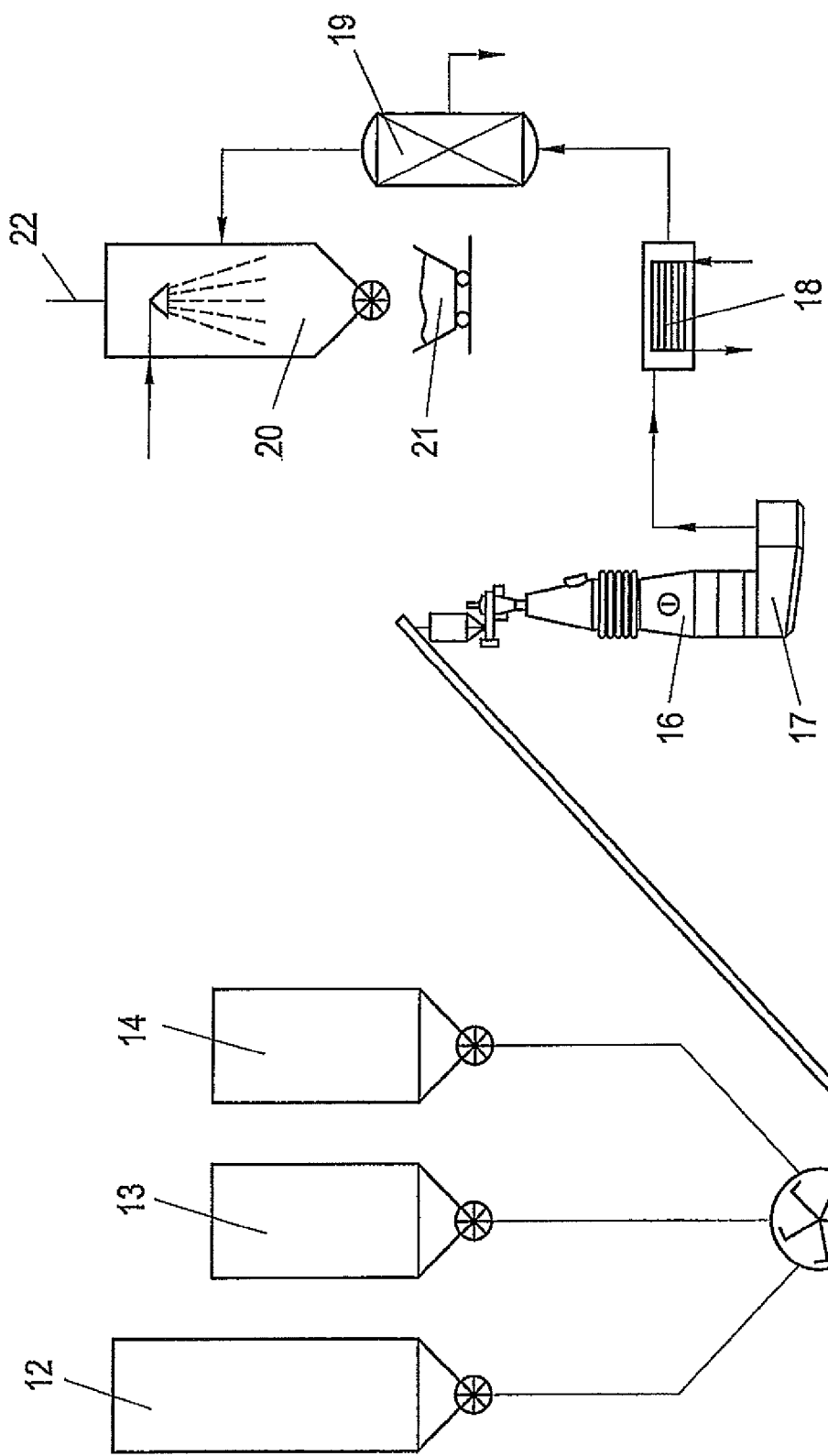
FIG. 2 shows a block diagram of a simplified procedure.

In FIG. 2, it can be seen that in a simplified procedure, the waste material along with lime carriers and coal dust from respective hoppers 12, 13 and 14 are placed in a mixer 15. From the mixer, the mixture is placed sent to an infeed device of a reduction reactor 16. In the reduction reactor 16, the metal oxides are reduced and pig iron and cement slag can be tapped off at the tundish 17. The hot gases are drawn off at temperatures of approximately 1600° C. and cooled to about 400° C. in a heat exchanger 18. Heavy metals, alkalis and halogens can now be separated in an appropriate separator 19 and the remaining gas, which also contains phosphorus in addition to CO and $H_2$, is subjected to a water quench 20, where the phosphorus condenses out and can be collected in an appropriate receptacle 21 as white phosphorus. The residual combustion gas or product gas is withdrawn via the flue 22.

Figure 3:
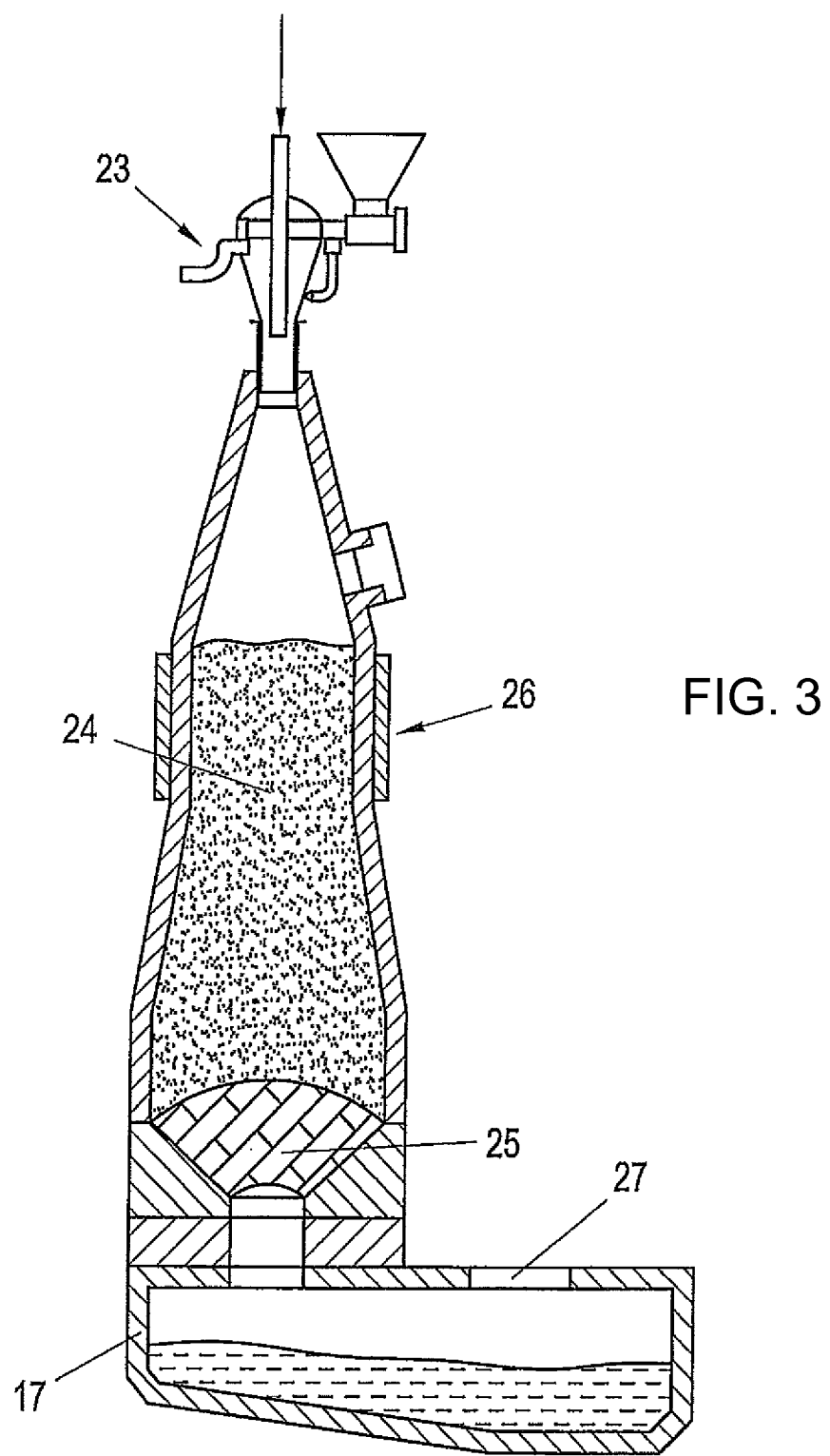
FIG. 3 shows a reduction device for carrying out the simplified method.

FIG. 3 shows parts of the reduction device in more detail. The reference numeral 23 indicates an infeed device via which the starting materials are supplied to a coke and/or graphite bed 24 in as even a manner as possible. The bed 24 rests on a lining 25 formed from refractory material and is heated inductively by means of the coil 26. In addition to the discharge for the molten iron and the cement slag, the tundish 17 has a flue 27 for the product gases which then undergo fractionating condensation.

The invention claimed is:

1. A method of extracting phosphorous or a derivative thereof from organic waste material containing oxides of phosphorus and metal oxides, the method which comprises:
    mixing chlorine carriers into the organic waste material and adding lime to the waste material, to form a waste material admixture supplemented with chlorine carriers and lime;
    heating the resulting admixture at an air ratio of 0.85≤λ≤ to 1.6 and at least partially oxidizing;
    drawing off volatile metal chlorides thus formed with the gas phase, leaving a remaining melt fraction;
    recovering the metal chlorides;
    subjecting the remaining melt fraction which contains phosphorous to a reduction process to form gaseous elemental phosphorus or a derivative thereof; and
    drawing off the gaseous elemental phosphorous or a derivative thereof.

2. The method according to claim 1 wherein the organic waste material is sewage sludge.

3. The method according to claim 1, wherein the heat-treating step comprises heat treatment at temperatures of 1300° C.-1600° C.

4. The method according to claim 1, wherein the heating step comprises forcing the organic waste material mixed with the chlorine carriers into a combustion chamber with a carrier gas via a cyclone.

5. The method according to claim 4, wherein an oxygen-containing gas is used as the carrier gas.

6. The method according to claim 5, wherein the oxygen-containing carrier gas is hot air.

7. The method according to claim 1, wherein the chlorine carriers are selected from the group consisting of chlorine-containing polymers, alkali chlorides, alkaline-earth chlorides, cement kiln dust, and steel mill dust.

8. The method according to claim 1, wherein reducing the fraction remaining after drawing off metal chlorides is effected with an at least partially inductively heated column with lump coke and/or graphite, and the elemental phosphorus thereby liberated is drawn off.

9. The method according to claim 8, wherein the phosphorus which is drawn off is quenched to obtain white phosphorus.

10. The method according to claim 1, wherein the reduction process is performed in an inductively heated reactor controlled by electrical power and a redox potential of a column is adjusted by blowing in gases and adjusting a temperature of the column by adjusting the electrical power and by blowing in gases.

11. A method according to claim 1, wherein the organic waste material contains iron oxide.

12. A method according to claim 1, wherein the waste material supplemented with chloride carriers and lime is conveyed into the interior of a combustion chamber where a ratio of air, $O_2$, and chloride gaseous carriers is set, the temperature is 1300° C.-1600° C., the product gas which contains the metal chlorides is drawn off via a discharge line and is separated from the melt, said melt being sent to a coke and/or graphite bed which is inductively heated, wherein reduction to elemental phosphorous occurs in the bed and the phosphorous is drawn off and condensed.

* * * * *